United States Patent [19]

Arakawa

[11] Patent Number: 4,642,658

[45] Date of Patent: Feb. 10, 1987

[54] IMAGE FORMING APPARATUS

[75] Inventor: Junichi Arakawa, Yokohama, Japan

[73] Assignee: Canon Kabushiki Kaisha, Tokyo, Japan

[21] Appl. No.: 809,765

[22] Filed: Dec. 17, 1985

[30] Foreign Application Priority Data

Dec. 20, 1984 [JP] Japan .............................. 59-269876

[51] Int. Cl.4 .......................................... G01D 15/10

[52] U.S. Cl. ............................. 346/76 PH; 346/105; 400/120; 400/323; 400/208

[58] Field of Search .................. 346/76 PH, 105, 106; 400/120, 207, 208, 218, 323; 219/216 PH

[56] References Cited

U.S. PATENT DOCUMENTS

| | | | |
|---|---|---|---|
| 3,855,448 | 12/1974 | Hanagata et al. | 219/216 |
| 3,970,183 | 7/1976 | Robinson et al. | 197/1 R |
| 4,511,903 | 4/1985 | Miyazaki et al. | 400/208 |
| 4,512,674 | 4/1985 | Suzaki et al. | 400/208 |

FOREIGN PATENT DOCUMENTS

| | | | |
|---|---|---|---|
| 0067494 | 4/1983 | Japan | 400/218 |

*Primary Examiner*—Arthur G. Evans

*Attorney, Agent, or Firm*—Fitzpatrick, Cella, Harper & Scinto

[57] ABSTRACT

An image recording apparatus is provided with a device for detecting the presence or absence of an ink ribbon, which is characterized in that one of a one-direction recording mode and a both-direction recording mode is selected in accordance with the result of the detection of the detecting device.

7 Claims, 8 Drawing Figures

IMAGE FORMING APPARATUS

BACKGROUND OF THE INVENTION

1. Field of the Invention

This invention relates to an image recording apparatus for recording images on a recording sheet, such as an electronic typewriter, a facsimile apparatus or a thermal printer. The present invention also relates to an image recording apparatus capable of automatically selecting one-direction recording or both-direction recording by detecting the presence of an ink ribbon, and efficiently accomplishing recording without any wrong operation.

2. Description of the Prior Art

Description will hereinafter be made with a so-called serial type thermal printer taken as an example of the image recording apparatus.

FIG. 1 of the accompanying drawings shows a serial type thermal printer according to the prior art. A thermal head 3 attached to a heat sink 2 is mounted on a carriage 1 and is slidable along a guide shaft 4. Also, a ribbon cassette 6 containing an ink ribbon 5 therein is removably placed on the carriage 1. The ink ribbon 5 is supplied from a supply roll 5*a* provided in the cassette 6 to between a recording sheet 8 on a platen 7 and the thermal head 3 and thereafter is taken up by a take-up roll 5*b*, and the ink on the ink ribbon 5 is transferred to the recording sheet by the heat of the thermal head 3 corresponding to image information. Designated by a, b, c and d are guide pins. An Electric power for heating is supplied from a connector 10 on a printing base plate 9, fixed to the chassis of the printer, to the thermal head 3 through a flexible cable 11.

Further, in this thermal printer, heat-sensitive recording becomes possible by removing the ribbon cassette and replacing the recording sheet with heat-sensitive recording paper and thus, the thermal printer can be used as an apparatus for both heat transfer recording and heat-sensitive recording.

Now, generally, the relation between the recording sheet and the ink ribbon when heat transfer recording is effected with the ribbon cassette mounted so that a relative velocity is not created between the two. This is in order that the recording sheet and the ink ribbon are rubbed against each other to stain the recording sheet.

FIG. 2*a* shows a case where the ribbon take-up direction 12 and the carriage movement direction 13 are opposite to each other, and in this case, the carriage movement velocity $V_2$ and the ribbon take-up velocity $V_1$ are in the relation that $V_1=V_2$ and the relative velocity between the recording sheet 8 and the ink ribbon 5 is zero. On the other hand, FIG. 2*b* shows a case where the ribbon take-up direction 12 and the carriage movement direction 14 are identical to each other, and in this case, the sum $V_1+V_2$ of the carriage movement velocity $V_2$ and the ribbon take-up velocity $V_1$ is the relative velocity between the recording sheet 8 and the ink ribbon 5, and relative movement is inevitably created between the two. So, in this case, the ink ribbon can be fed in the opposite direction, but if this is done, the used ribbon which has lost ink is fed to the front of the thermal head and thus, recording becomes impossible. For the reason as set forth above, when heat transfer recording is to be effected in the conventional thermal printer, only one-direction recording can be accomplished and accordingly, the thermal head on the carriage has been urged against the recording sheet during the forward movement thereof to effect recording on the recording sheet, but has been spaced apart from the recording sheet during the backward movement thereof. However, with such a construction, only one-direction recording can be accomplished even when heat-sensitive recording is to be effected and thus, the recording speed decreases by half.

SUMMARY OF THE INVENTION

It is an object of the present invention to provide an image recording apparatus which is capable of efficiently recording images on a recording sheet.

It is another object of the present invention to provide an image recording apparatus which is capable of automatically selecting one-direction recording or both-direction recording by detecting the presence of an ink sheet.

It is still another object of the present invention to provide an image recording apparatus which can be reduce a wrong operation.

DESCRIPTION OF THE PREFERRED EMBODIMENT

Figure 1:
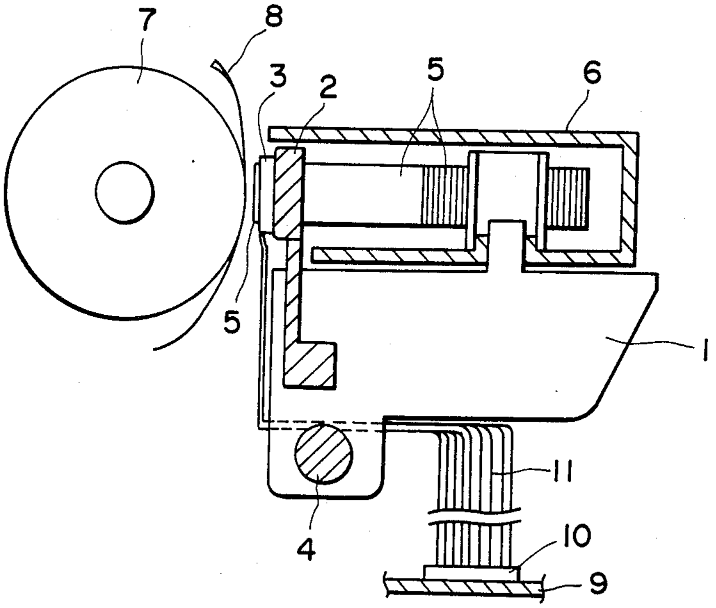
FIG. 1 PRIOR ART
FIG. 1 is a cross-sectional view of a thermal printer according to the prior art.
Figure 2A:
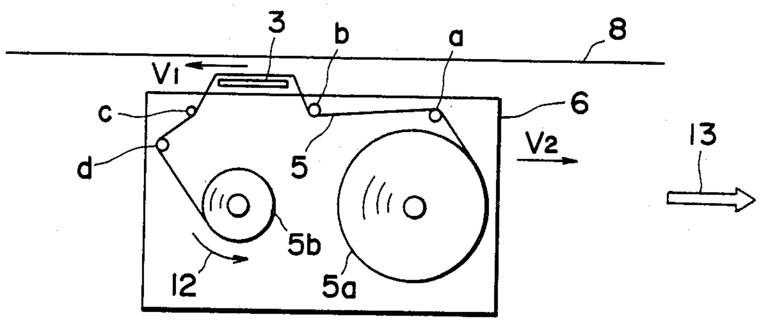
FIGS. 2*a* and 2*b* illustrate the printing operation.
Figure 2B:
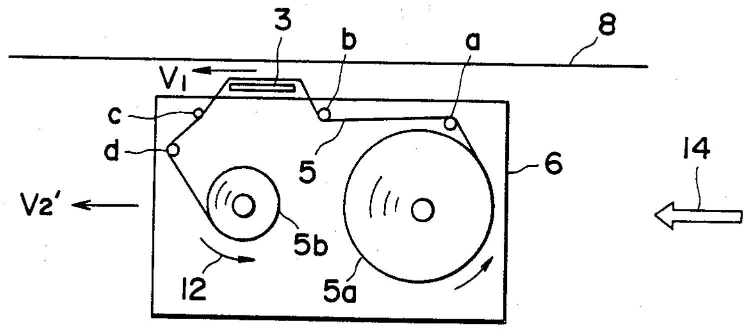
Figure 3:
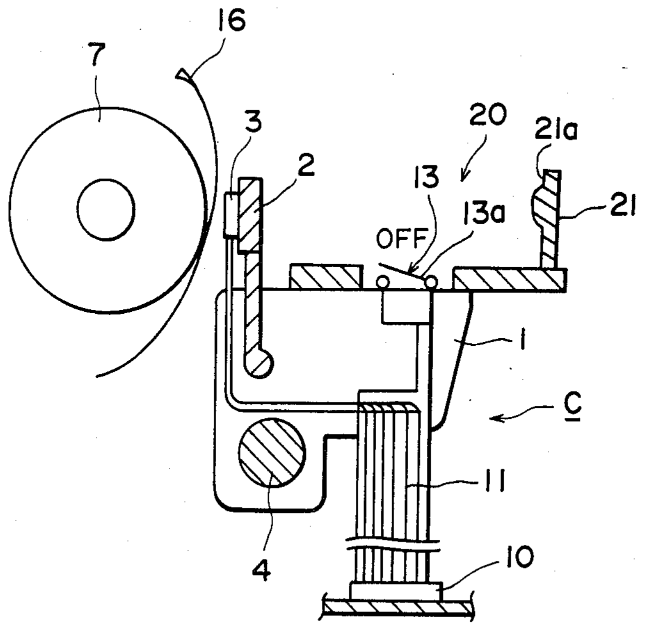
FIGS. 3 and 4 are cross-sectional views of a thermal printer which is an embodiment of the present invention and respectively showing a case where a ribbon cassette is not mounted and a case where the ribbon cassette is mounted.

FIG. 3 is a side cross-sectional view of a printing apparatus C according to an embodiment of the present invention and showing the apparatus during heat-sensitive printing. In FIG. 3 members functionally similar to those in FIGS. 1 and 2 are given similar reference numerals and need not be described. A heat-sensitive recording sheet 16 generates a color by the heat generation of a thermal head 3 corresponding to recording information and an image is recorded thereon. In this case, the thermal head 3 generates heat both during forward movement and during backward movement and effects image recording on the heat-sensitive recording sheet 16. The recording sheet 16 is conveyed by an amount corresponding to a line when the forward movement of the head 3 is terminated. On the upper surface of a carriage 1, a ribbon cassette detecting switch 13 comprising a microswitch or the like is provided projectedly in a loading portion 20, and the signal thereof is supplied to an operation control circuit (hereinafter referred to as the CPU) 14 to be described through a flexible cable 11 and a connector 10. In the state shown, an ink ribbon cassette 6 is not mounted on the loading portion 20 and the switch 13 is in its OFF position.

Figure 4:
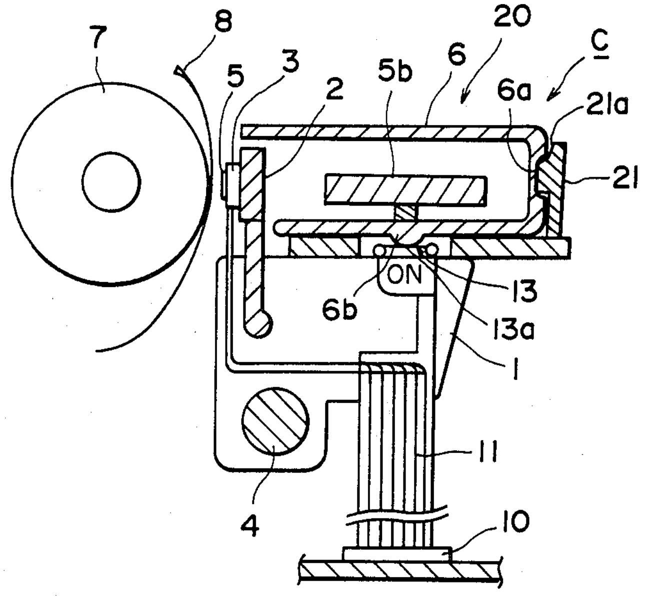

FIG. 4 shows the printng apparatus C during heat-sensitive transfer and printing.

First, the ink ribbon cassette 6 is mounted onto the loading portion 20 so that a ribbon 5 comes to lie between the recording sheet 8 and the thermal head 3.

That is, the cassette 6 is dropped from above onto the loading portion 20 along the inclined portion 21*a* of a resilient restraining member 21. Then, with the bottom of the cassette 6 having reached the loading portion 20, the convex portion 21*a* of the restraining member 21 fits in the recess 6*a* of the cassette 6 and thus, the cassette 6 is mounted on the loading portion 20. At this time, a convex portion 6*b* provided at the bottom of the cassette 6 depresses the actuator 13*a* of the switch 13, which thus assumes its ON position. That is, switch 13 provided on the upper surface of the carriage 1 is brought into its ON position by the ribbon cassette 6 being mounted, whereby the cassette mounting signal is supplied to the CPU 14 through the flexible cable 11 and the connector 10. Thereafter, by a print starting signal, the ink of the ink ribbon 5 is transferred to the plain paper 8 with the aid of the heat generation of the thermal head 3 corresponding to the recording information, and thus, image recording is accomplished.

Figure 5:
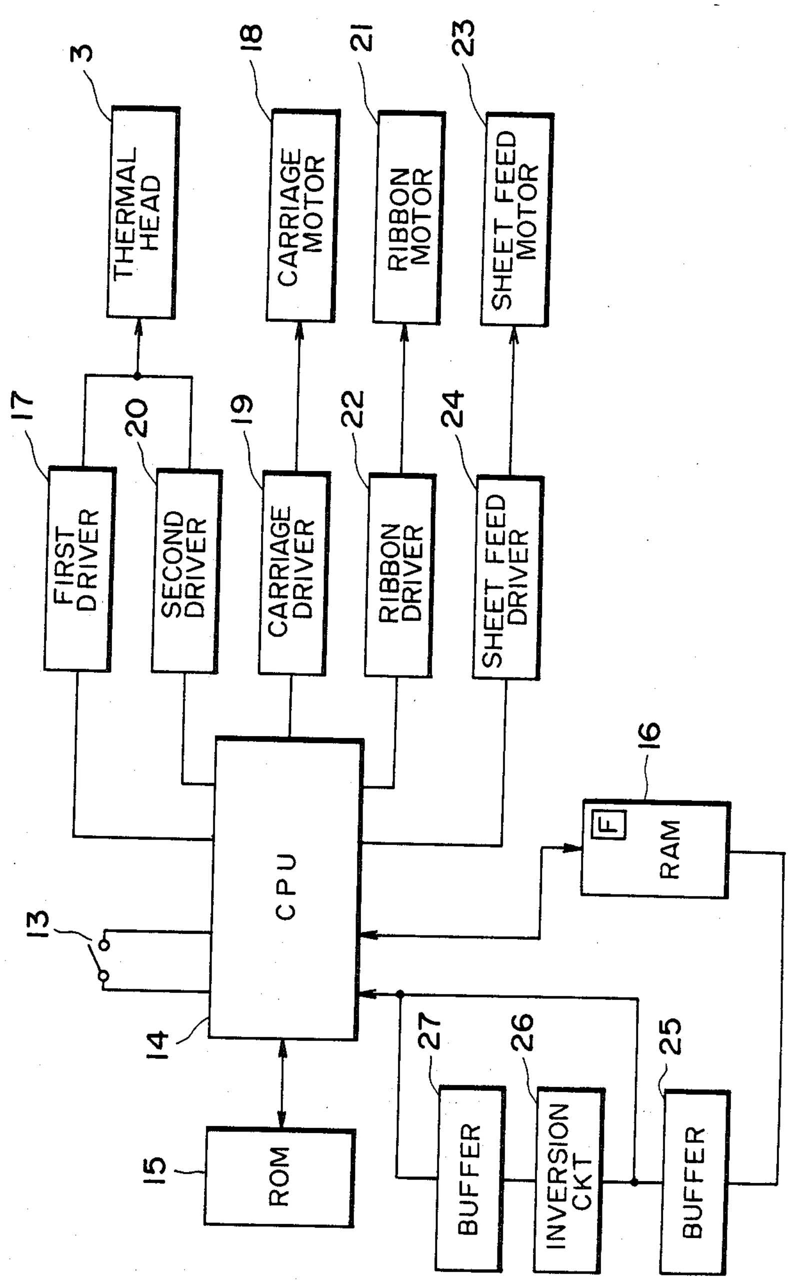
FIG. 5 is a block circuit diagram.

FIG. 5 shows the electrical block construction of the present printing apparatus. In FIG. 5, the CPU 14 reads the data corresponding to a line, of the printing to a line, of the printing data stored in RAM 16, into a line buffer 25 in accordance with the processing procedure stored in ROM 15, and records this data on the recording sheet. When the detecting switch 13 provided on the carriage 1 is in its OFF position, the CPU 14 judges that the apparatus is in the heat-sensitive recording mode, and supplies to the heat-generating element of the thermal head 3 a heat pulse having a pulse width and a voltage suitable for heat-sensitive recording, through a first driver 17 on the basis of the data in the buffer 25, and effects heat-sensitive recording on the heat-sensitive sheet. At the same time, a carriage driving motor 18 connected to the carriage 1 by a timing belt, not shown, is driven through a driven 19 and data corresponding to a line is recorded on the heat-sensitive sheet. More particularly, reciprocal recording is effected in this heat-sensitive recording mode, and recording corresponding to a line effected during the forward movement and the backward movement, respectively, of the carriage 1. Accordingly, during the recording in the backward direction, it is necessary to record the data inverted from left to right relative to the recording in the forward direction. Therefore, during the recording in the backward direction, the content of the buffer 25 is inverted from left to right through an inversion circuit 26, and the thus inverted data is stored in a buffer 27. The content of this buffer 27 is supplied to the thermal head 3, whereby normal recording is accomplished.

On the other hand, when the detecting switch 13 is in its ON position, the CPU 14 judges that the apparatus is in the heat transfer recording mode, and supplies to the thermal head 3 a heat pulse having a pulse width or a voltage suitable for heat transfer recording through a second driver 20 and effects heat transfer recording on the recording sheet. At this time, the carriage 1 is driven by the motor 18 and the ribbon 5 in the ribbon cassette 6 on the carriage 1 is taken up onto a take-up roller 5*b* by a motor 21 for ribbon on the carriage 1. Also, during this heat transfer recording mode, the ribbon 5 is taken up only when the carriage 1 is moved in the forward direction, and recording is effected on the recording sheet. Designated by 23 is a sheet feed motor for rotating a platen 7 and thereby effecting sheet feeding. The motor 23 effects paper feeding by an amount corresponding to one or several lines with the aid of a driver 24.

Figure 6:
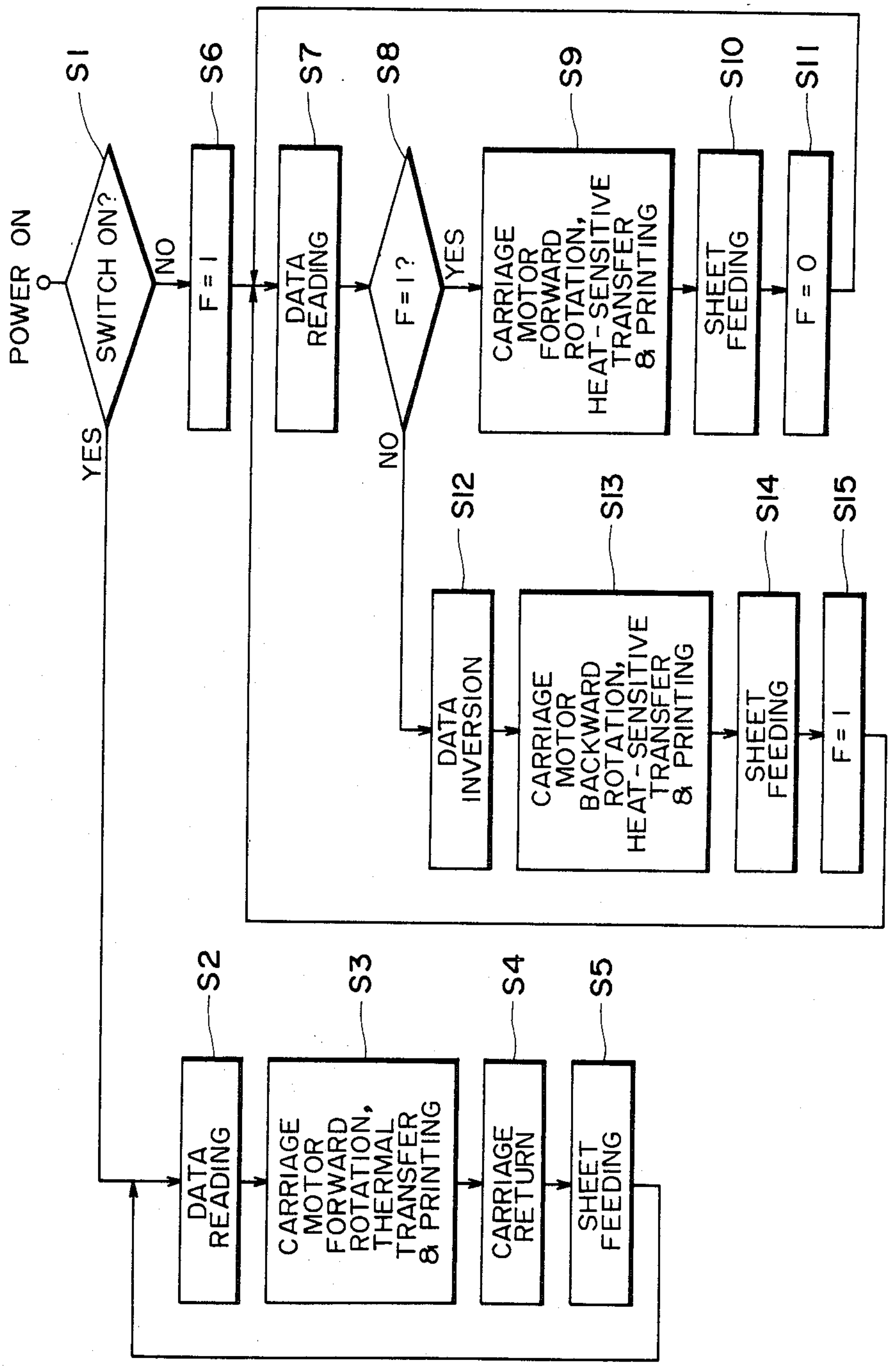
FIG. 6 is a flow chart.

FIG. 6 is a flow chart showing the operation of the present embodiment, and the program therefor is stored in the ROM 15.

When a main switch or an on-line switch not shown, is closed, the position in which the detecting switch 13 is detected at step S1. If the switch 13 is in its ON position, it is judged that the apparatus is in the heat transfer recording mode and at step S2, recording data corresponding to a line is read from the RAM 16 into the line buffer 25. Subsequently, at step S3, the carriage motor 18 is rotated in the forward direction to move the carriage 1 in the forward direction and drive the thermal head 3 through the driver 20 on the basis of the data in the buffer 25 and further, heat transfer recording corresponding to a line is effected while the ribbon 5 is taken up through the ribbon motor 21. When recording corresponding to a line is completed by such an operation, the carriage return is effected at step S4, and at step S5, sheet feeding by an amount corresponding to a line is effected, and the program again returns to step S2. Recording corresponding to a page or recording corresponding to more pages if the recording sheet is continuous paper is effected while the above-described operation is repeated.

On the other hand, when at step S1, the detecting switch 13 is in its OFF position, it is judged that the apparatus is in the heat-sensitive recording mode and, at step S6, a recording direction flag F in the RAM 16 is set to 1. Thereafter, data corresponding to a line is read from the RAM 16 into the line buffer 25 and at step S8, the state of the flag F is examined. In this case, F=1 at step S6 and therefore, it is judged recording in the forward direction should be effected, and the carriage motor 18 is rotated in the forward direction and the thermal head 3 is driven through the first driver 17 in accordance with the data in the buffer 25, whereby heat-sensitive recording corresponding to a line is effected on the heat-sensitive sheet. When the forward direction recording corresponding to a line is effected, sheet feeding by an amount corresponding to a line is effected at step S10, and the recording direction flag F is reset to 0, whereafter the program again returns to step S7. Hereupon, data corresponding to a line is again read into the line buffer 25 and the state of the flag F is judged, but now F=0, and therefore it is judged that recording in the backward direction should be effected, and at step S12, the data inverted from left to right is stored in the buffer 27. Thereafter, at step S13, the carriage motor 18 is rotated in the reverse direction to move the carriage 1 in the backward direction and at the same time, drive the thermal head 3 on the basis of the data of the buffer 27, whereby the backward direction recording corresponding to a line is effected. After the recording has been completed, sheet feeding by an amount corresponding to a line is effected at step S14 and further, at step S15, the flag F is set to 1 and the program again returns to step S7.

Recording corresponding to one or more pages is terminated while the above-described operation is repeated.

Thus, according to the present embodiment, the heat-sensitive recording mode and the heat transfer recording mode are automatically selected depending on the presence or absence of the ribbon cassette 6 and therefore, it is not necessary to manually select the recording modes. Also, any wrong operations are avoided. Further, in the heat-sensitive recording mode, both-direction recording is automatically done and thus, very efficient recording can be accomplished.

Figure 7:
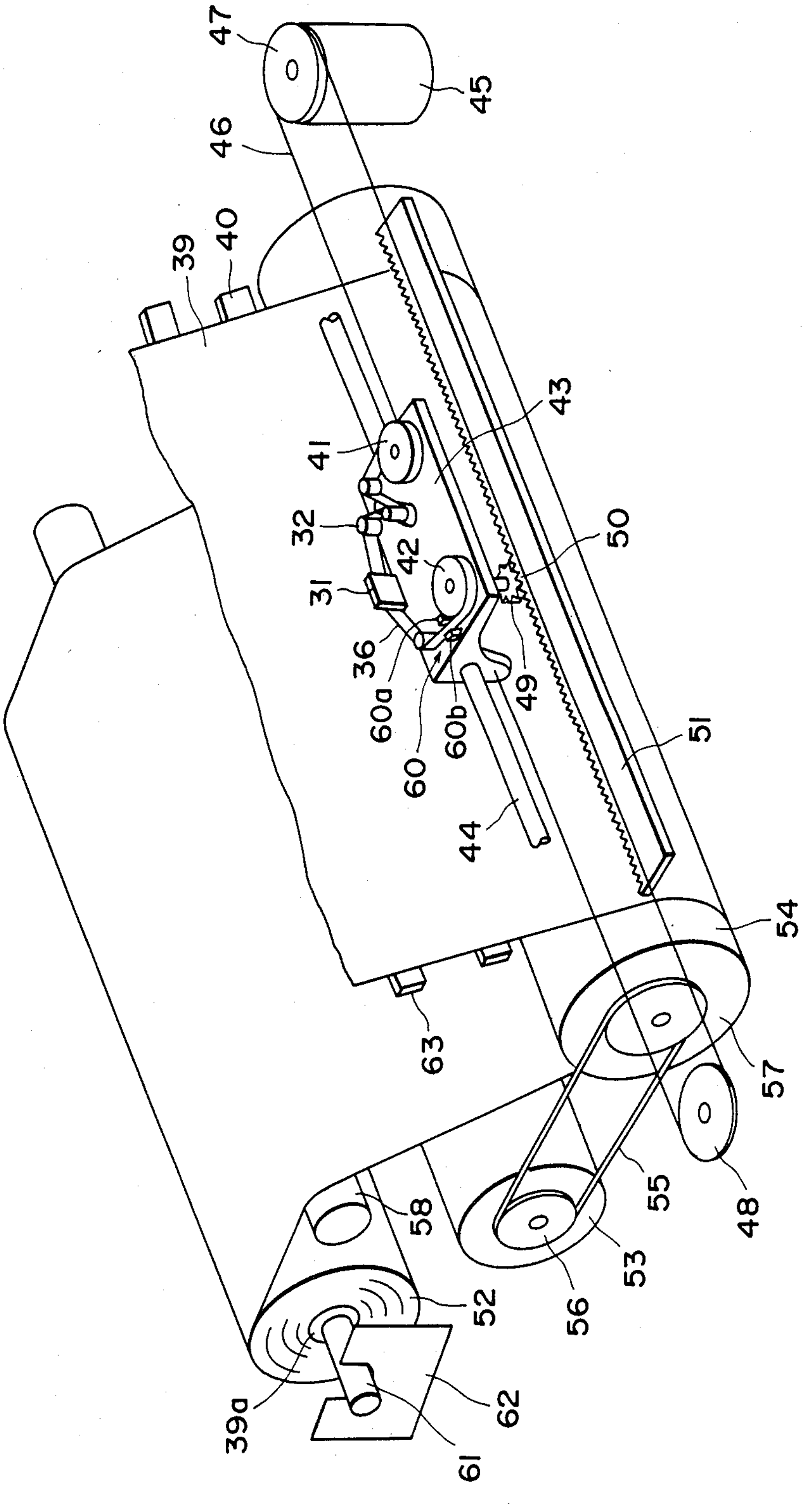
FIG. 7 is a perspective view of a serial type thermal printer to which an embodiment of the present invention is applied.

FIG. 7 is a perspective view of a serial type thermal printer to which an embodiment of the present invention is applied.

In FIG. 7, reference numeral 31 designates a themal head having thirty-five heat generating elements (not shown) made of a semiconductor such as silicon, a holding plate of ceramics for holding the heat generating elements, a flexible wiring material for supplying an electric power to said heat generating elements, and a heat sink made of aluminum or like material for diffusing the heat of said heat generating elements. Each of said heat generating elements contains a resistor therein, and they are designed to generate heat independently by a power supply corresponding to image information.

Reference numeral 36 denotes an ink tape comprising an ink layer containing a heat-melting material and provided on a relatively thin heat-resistable support tape such as a tape of thin paper or heat-resistable plastic. The ink layer containing a thermoplastic material does not exhibit liquid phase at a normal temperature, but melts at a temperature of 60° C.–150° C., for example and becomes liquid and exhibits the characteristic of printing ink. The ink layer consists, for example, of carbon black basic pigment, oleic acid or the like added to fatty oils and fats such as wax mineral oil or vegetable oil. In making the tape, said ink is heated and melted and then is applied to the surface of a heat-resisting tape such as paper and solidified.

The head 31 brings the ink tape 36 into intimate contact with the surface of a recording sheet 39, and an elastic plate 40 of rubber or felt is held against the back of the recording sheet 39. When an electric power corresponding to image information is supplied to the heat generating elements of the head 31 for 10–20 ms, the surface temperature of the heat generating elements is transmitted to the ink layer through the support tape of the ink tape 36 and the applied ink melts and is transferred to the recording sheet 39. The temperature of the heat generating elements drops to a level below the melting point of the ink in 4–10 ms after the power supply. Now a carriage 43 on which the head 31, the ink tape 36, a tape feeding reel 41 and a take-up reel 42 are mounted is slidably supported on a guide 44 and is intermittently reciprocated along the recording sheet 39 by a driving mechanism including reversible pulse motor 45, a wire 46 and pulleys 47, 48. The take-up reel 42 intermittently takes up the tape 36 with the movement of the carriage 43 by a pinion 50 mounted on the shaft 49 of the take-up reel being in mesh engagement of a fixed rack 51.

Reference numeral 52 designates a roll of recording sheet, reference numeral 53 denotes a recording sheet feeding motor, reference numeral 54 designates a recording sheet feeding platen roller which receives the power from the motor 53 through a belt 55 and pulleys 56, 57, and reference numeral 58 denotes a tension roller. Reference numeral 60 designates ink tape mount detecting means having means a light-emitting portion 60*a* and a light-receiving portion 60*b*. When the ink tape 36 is mounted on the carriage 43, the light from the light-emitting portion 60*a* is intercepted and the ink tape mount detecting means 60 produces an ink tape mount signal. In the present embodiment, by the central openings of the reels 41 and 42 being fitted to pins 43*a* and 43*b*, respectively, secured to the carriage 43, the ink tape 36 is mounted on the carriage 43.

When the mount signal from the detecting means 60 is produced, the thermal head 31 generates heat only during the forward movement by the control of the aforedescribed control means and effects recording on the recording sheet.

On the other hand, if the ink tape 36 is removed from the carriage 43 and the recording sheet 39 is changed from plain paper to heat-sensitive paper which generates a color by heat, the detecting means 60 produces an ink tape "absence" signal and therefore, the control means causes the thermal head 31 to generate heat both during its forward movement and during its backward movement, thus effecting image recording on the heat-sensitive paper.

The thermal head 31 may be designed to record an image corresponding to a line during its forward movement and during its backward movement, or may be designed to record an image corresponding to the second line during its backward movement by feeding the heat-sensitive paper by an amount corresponding to a line after the forward movement has been terminated and before the backward movement is started.

The heat generation temperature and time of the thermal head are suitably controlled by the control means in accordance with the type of the recording sheet (plain paper, heat-sensitive paper or plastic sheet for OHP).

The recording sheet 39 (such as plain paper or heat-sensitive paper) is mounted on the apparatus body by causing the roll 39*a* thereof to be fitted on a support shaft 61 removably mounted on the apparatus body side and be along the peripheral surface of the platen roller 54, the elastic plate 40 and a guide 63 designated by 62 is a portion for mounting the support shaft 61 on the body side. The exterior of the apparatus body is not shown. The recording sheet is not limited to the form of a roll, but may also be, for example, in the form of cut sheet.

The present invention is not restricted to the first embodiment, but may also be of the type which detects not only the presence of the ink ribbon cassette but also the presence of the ink ribbon in the form of a reel shown in the second embodiment. Further, in the present invention the heat transfer recording includes not only the heat melting type transfer but also various types of heat transfer recording such as the heat sublimation type and the heat permeation type. That is, the image recording apparatus of the present invention covers all of apparatuses for effecting image recording by heat.

According to the present invention, as described above, the presence of the ink ribbon is detected and one-direction or both-direction recording is automatically selected and therefore, efficient recording free of any wrong operation is possible.

What I claim is:

1. An image recording apparatus for recording on a recording sheet an image corresponding to image information, said apparatus comprising:

a recording sheet mounting portion for mounting the recording sheet on which the image is to be recorded;

an ink sheet mounting portion for mounting an ink sheet having ink thereon;

detecting means for detecting whether the ink sheet is mounted on said ink sheet mounting portion;

image recording means operable for recording the image corresponding to the image information on the recording sheet mounted on said recording sheet mounting portion;

moving means for reciprocally moving said image recording means relative to the recording sheet; and control means for operating said recording means only during movement thereof in one direction relative to the recording sheeting when said detecting means detects that the ink sheet is mounted and during movement thereof in two directions relative to the recording sheet when said detecting means does not detect that the ink sheet is mounted.

2. An image recording apparatus according to claim 1, wherein the recording sheet is plain paper.

3. an image recording apparatus according to claim 1, wherein the recording sheet is heat-sensitive paper.

4. An image recording apparatus according to claim 1, wherein when said recording means is operated during movement thereof in two directions, the recording sheet is conveyed by an amount corresponding to a line before said recording means begins backward movement after termination of forward movement.

5. An image recording apparatus according to claim 1, wherein said recording means, when operated in two directions, records in a return direction data that is inverted in recording order with respect to the data recorded during movement in the forward direction.

6. An image recording apparatus for recording on a recording sheet an image corresponding to image information, comprising:

a recording sheet mounting portion for mounting the recording sheet on which the image is to be recorded;

an ink sheet mounting portion for mounting an ink sheet having ink thereon;

image recording means reciprocally movable relative to the recording sheet mounted on said recording sheet mounting portion, said image recording means being operable for recording on the recording sheet the image corresponding to image information in a first recording mode in which recording is effected by using the ink sheet mounted on the ink sheet mounting portion and in a second recording mode in which image recording is effected without using the ink sheet;

change-over means for changing the recording mode between the first and second recording modes; and control means for controlling said recording means such that in the first recording mode recording is performed only during movement said recording means in one direction relative to the recording sheet and in the second recording mode recording is performed during movement of said recording means in two directions relative to the recording sheet.

7. An image recording apparatus according to claim 6, wherein said recording means, when operated in two directions, records in a return direction data that is inverted in recording order with respect to the data recorded during movement in the forward direction.

* * * * *